July 31, 1962 E. F. PETERSON 3,047,752
AIR COOLED MOTOR VIBRATOR

Filed June 11, 1959 3 Sheets-Sheet 1

INVENTOR:
Edwin F. Peterson
BY
Eberhard C. Welty
Atty.

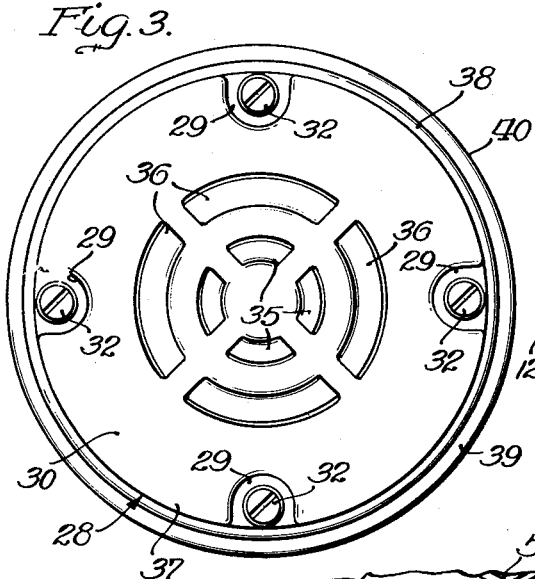
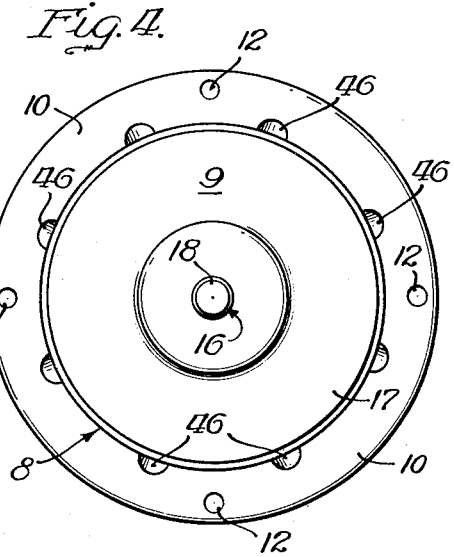
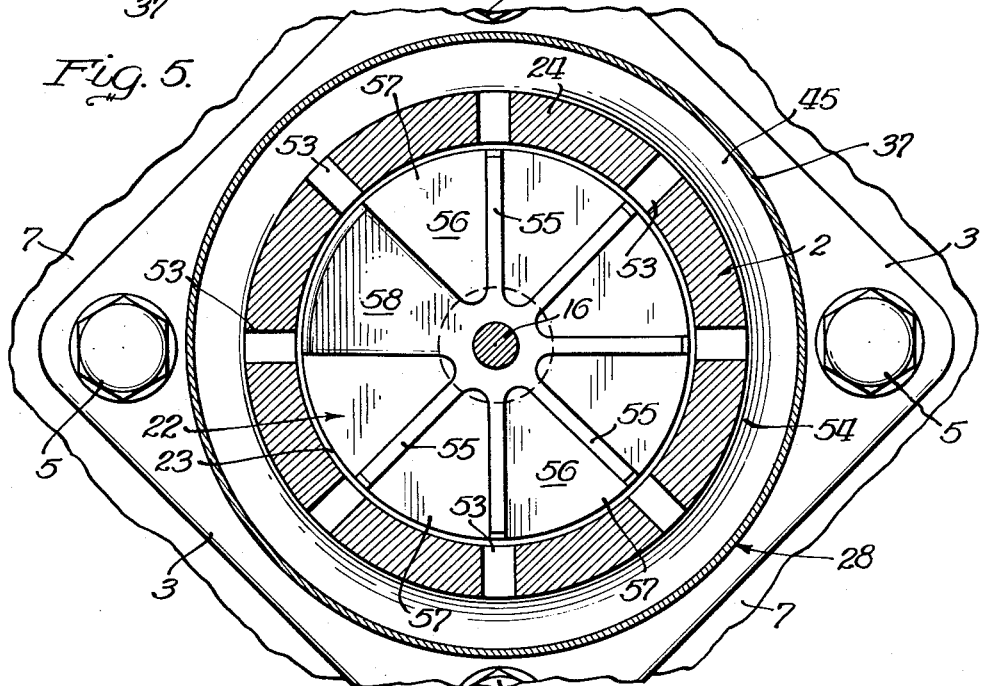
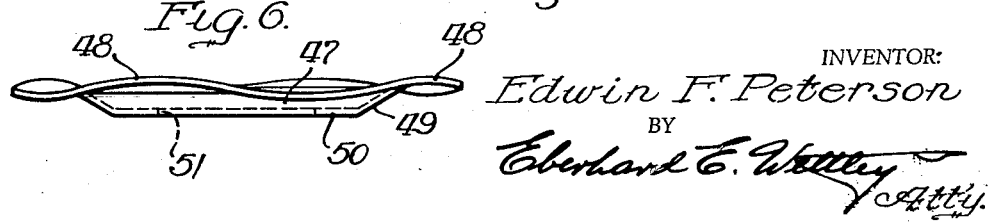

July 31, 1962 E. F. PETERSON 3,047,752
AIR COOLED MOTOR VIBRATOR
Filed June 11, 1959 3 Sheets-Sheet 3
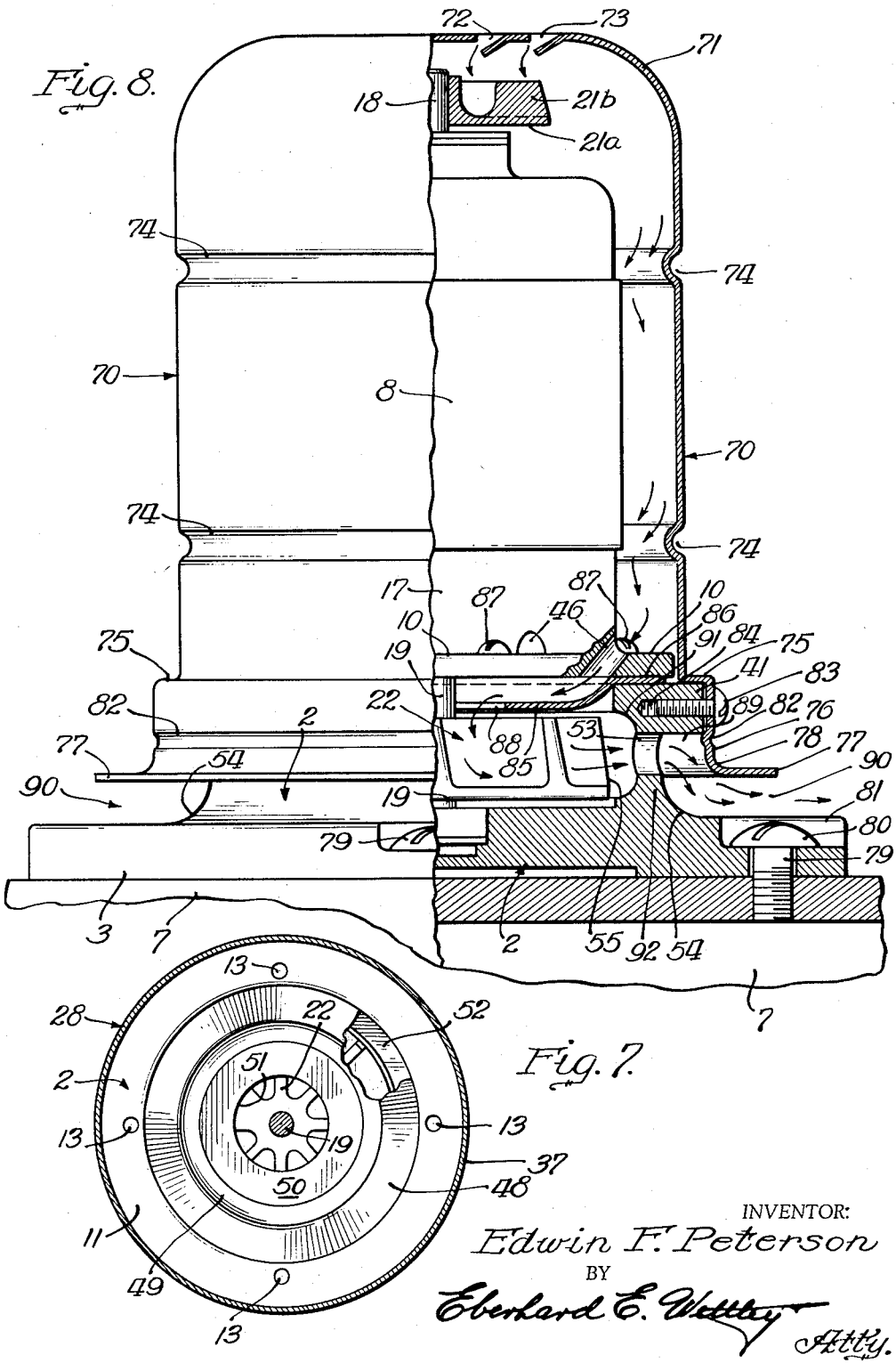
INVENTOR:
Edwin F. Peterson
BY
Eberhard E. Wellty
Atty.

United States Patent Office 3,047,752
Patented July 31, 1962

3,047,752
AIR COOLED MOTOR VIBRATOR
Edwin F. Peterson, P.O. Box 151, Neponset, Ill.
Filed June 11, 1959, Ser. No. 819,595
20 Claims. (Cl. 310—81)

This invention relates to new and novel design of a motor driven vibration producing mechanism.

More specifically the invention is directed to a vibration producing mechanism combining an electric motor and an unbalanced fan or blower means driven thereby including other cooperative mounting and enclosure means all providing a given airflow pattern to cool the vibrator structure and its component operating and static elements.

One of the objects of this invention is to provide a unitary compact motor powered vibrator that provides a cooling system to dissipate heat from the motor and combined parts of the vibrator to insure efficient, effective and continued operation of the device.

Another object is to provide the vibrator with an impeller as a fan or blower to move the cooling air through the vibrator mechanisms and to include combined unbalanced means to induce off center loads for developing the vibrational action.

Another object is to provide a motor vibrator with coacting mounting means and motor casing plus a cover assembly or shroud that all act together to develope predetermined airflow paths or channels to directly cool the motor and the vibrator structural parts by a continuous unidirectional airflow through the assembled device.

A still further object is to include dual airflow and heat dissipation means to initially direct the inlet or cooler ambient air against and over the armature end of the motor and to then channel this air along the entire motor housing toward the impeller end of the motor for air cooling the vibrator supporting assembly prior to discharge back into the ambient air zone at a remote area separated considerably from the intake or air inlet area of the device.

One other object relates to the provision of air passages and ducts through certain of the body portions of the assembled parts of the vibrator such as the motor housing and the vibrator supporting base whereby the mentioned and contiguous parts are all intimately serviced through close contact with the main air stream or by divisions thereof to bring about efficient and effective cooling of the vibrator unit as a whole under conditions of operation.

As another object, the vibrator embodies a combination of dual fans or blowers either one or both of which may be effective to induce forced airflow or wherein one may serve more specifically in the capacity of a ventilating instrumentality to counteract air stagnation in certain areas that require cooling.

Other objects and advantages shall hereinafter appear in or become apparent from the following detailed description of the invention having reference to the accompanying drawings forming a part of this specification.

In the drawings:

FIG. 3 is a reduced scale top plan view of the external shroud structure as assembled, but omitting the flanged portion of the supporting base of the vibrator which is better illustrated in FIG. 5;

FIG. 4 is a reduced scale top plan view of the armature end of the motor per se;

FIG. 5 is a plan sectional view taken substantially along the plane of the line 5—5 in FIG. 1 and looking in the direction of the arrows;

FIG. 6 is an edge elevational view of a shield or baffle member comprising one of the coacting means that contribute directly to the airflow pattern of the motor vibrator constructed according to the concept of the present invention;

FIG. 7 is a transverse top plan sectional view taken substantially along the plane of the line 7—7 in FIG. 1; and FIG. 8 is a side elevational view partially broken away and shown in section illustrating a somewhat modified construction of motor driven vibrator embodying the principles of the present invention.

Figure 1:
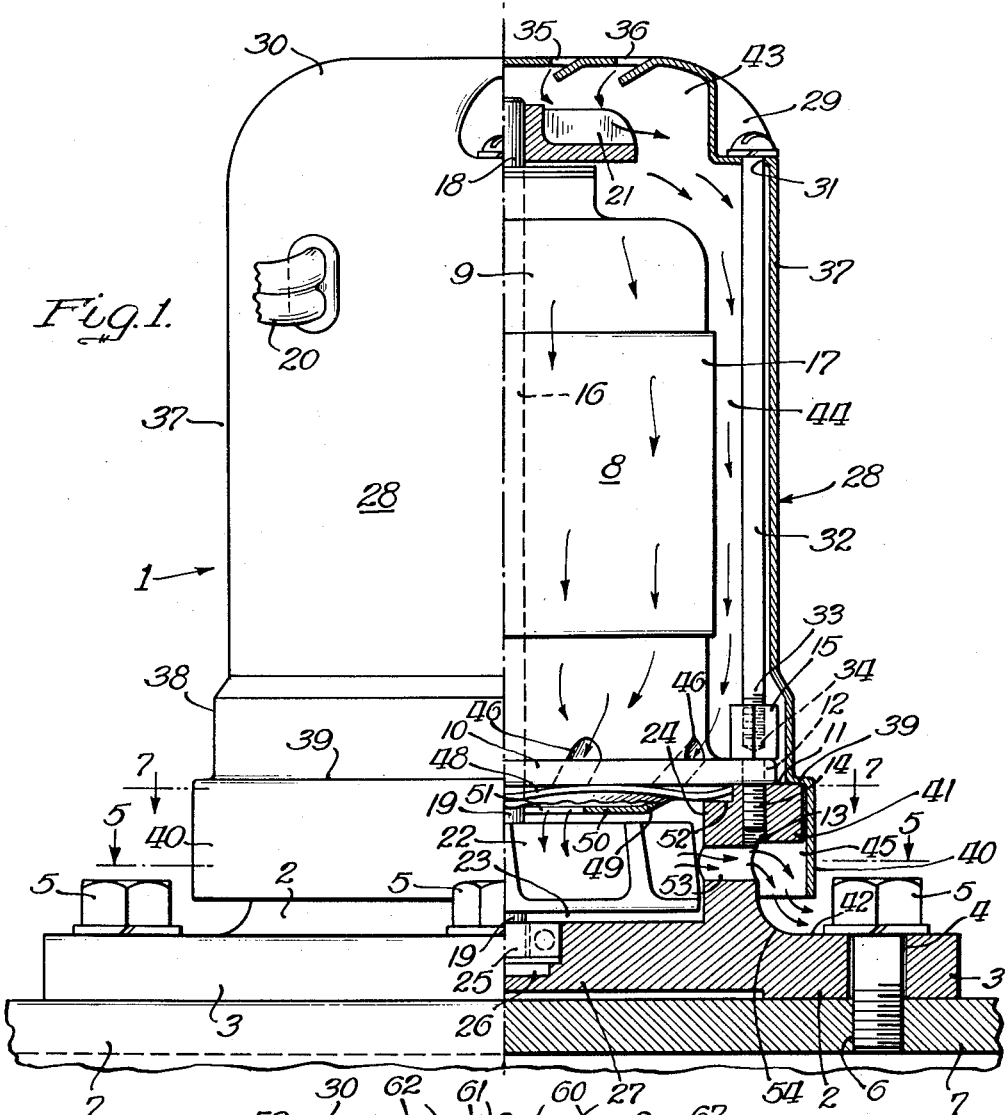
FIG. 1 is a side elevational view of a motor driven vibrator constructed according to the general concept of the present invention, the illustration being partly in section to better show the details of the present construction.

The general assembly and construction of the motor driven vibrator 1 is best shown in FIG. 1 of the drawings. The vibrator comprises a base 2 having a supporting or securing flange 3 provided with suitable apertures or openings 4 to accommodate fastening means such as screw means or bolts 5 that are shown as threaded into openings 6 in a wall portion of an object or device 7 that is being subjected to the vibratory action of the vibrator 1.

The propulsion or driving motor 8 is shown in an upright position in FIG. 1 to dispose the armature end 9 of the motor 8 upwardly or at least outwardly removed from the base 2 location. Motor 8 terminates with a base flange 10 annularly encircling the motor casing or body and arranged for seated face to face contact with the upper surface 11 of the vibrator base 2.

It should be understood that the position of the vibrator does not need to be limited to an upright axis considered with respect to the object or device to be shaken or vibrated. Any usable position and on any axis is contemplated for the vibrator 1 so that FIG. 1 demonstrates only one possible installation shown upright for convenience of illustration.

Motor flange 10 is apertured to provide openings 12 thereabout spotted for axial alignment with corresponding threaded openings such as 13 formed into the top surface 11 in base 2. Screws or bolts 14 having elongated hexagon heads 15 are provided to fixedly secure motor flange 10 against the surface 11 of vibrator base 2.

With further reference to FIG. 1, the drive shaft 16 of motor 8 is projected outwardly of the motor casing 17 to form a top driving shaft end 18 and a depending driving shaft end 19 both being concertedly rotated when the motor is suitably energized through external electrical supply wires 20.

A bladed circulating fan or blower 21 is connected for rotation with shaft end 18. The lower shaft end 19 of the motor 8 is equipped with an unbalanced fan or pocket type of blower 22 to develop forced air movement through the cooling system of the motor vibrator device.

Base 2 is constructed to provide an upwardly open cup 23 defined by an annular blower housing 24. It should be further noted that shaft 16 is journalled in the usual motor bearings at opposite outward ends of the motor casing 17 and that the blower end 19 is extended to reach into an outboard roller bearing 25 secured into a cavity 26 in the bottom wall 27 of base 2. Thus, with the comparatively short external extension of shaft end 19, this shaft section carrying the blower or fan 22 is practically entirely subject to shear in the plane of the blower 22 by the proximity of the two adjacent supporting bearings described. For all practical considerations, all radially acting bending strains and stresses induced by the unbalanced fan or blower 22 upon shaft 19 may be deemed negligible by reason of the above described construction of the vibrator at the blower location.

To complete the assembly described, an enclosure hood or shroud 28 is provided for the protection of the vibrator mechanisms to supply an important air conducting and air channelling structure for cooling the motor driven vibrator.

Shroud 28 is a deep drawn cylindrical member having recessed pockets 29 in the crown 30 with apertures 31 in the pockets 29 to accommodate the elongated securing bolts 32. The bolts 32 are so aligned as to cause the respective threaded ends 33 thereof to enter threaded sockets 34 provided in the hexagon heads 15 of motor fastening screws 14. The double pickaback fastening arrangement was provided to permit ready assembly and removal of the hood or shroud 28 without disturbing the motor base assembly or the orientation of these related parts.

Shroud or hood 28 is constructed with several sets of crown openings 35 and 36 generally arranged concentrically with respect to the axial center of the vibrator. The shroud or hood 28 provides a depending cylindrical wall 37 surrounding motor 8 and having a clearance offset 38 to accommodate the screws 15 and to surround the outer terminal circular edge of motor flange 10. The shroud 28 includes a radially formed shoulder 39 to seat upon surface 11 of base 2 and the shroud then terminates with a circular apron 40 disposed to surround an overhanging flange 41 provided on base 2. The apron 40 depends downwardly below the flange 41 to encircle the blower housing wall 24 and to end in vertically spaced relation above the upper surface 42 of the base flange 3.

The shroud or hood 28 thus cooperates with the motor 8 to form an inlet air cavity 43 beneath crown 30 and over the armature end of motor 8 and to form a connected contiguous annular air cavity 44 about motor 8 leading to the juncture of motor flange 10 with base 2. The apron 40 end of the shroud 28 then establishes an annular outlet cavity 45 about the blower housing wall 24 spaced above the upper surface 42 of the base flange 3.

Since the shroud shoulder 39 provides a sealing division at the surface 11 of base flange 41, separating cavity 44 from cavity 45, provision is made to bypass or conduct cooling air from cavity 44 into the blower housing 23 to supply air to the fan or blower 22 for cooling purposes. As seen in FIGS. 1 and 4, a plurality of openings 46 are drilled or otherwise formed through the body of the motor housing 17 at the flange 10 to communicate with the open end of the cup cavity 23 in the blower housing.

With a pocket type of blower such as 22, it is desirable to supply inlet or intake air generally centrally thereof considered in the axial region. This air is then expelled radially outwardly by the blower. To so channel the inlet air, an insert deflector or baffle 47 is installed comprising a wavy or undulant flange or rim 48 suspending a shallow dish comprising an inwardly and downwardly directed periphery 49 with a radial bottom wall 50 leading to a central opening 51 that is coincident with the axis of revolution of the blower 22. An annular recess 52 is formed into the top of the blower wall 24 of the blower housing to accommodate the deflector flange, the recess having a predetermined depth to tightly grip the flange at its undulations between the adjacent motor and the recess bottom. This provides an automatic assembly of the deflector 47 through the assembly of the motor 8 with the base 2.

Since the deflector is radially and axially oriented in recess 52 which forms a pocket against any air leak or bypass around the outer edge of the deflector flange, all air passing through the motor openings 46 is now funnelled through the dished portion of the deflector 47 out of its opening 51 into the axial central zone of blower 22 for radially outward pressurized dissipation by the blower within cavity 23 of the base 2.

The blower driven air is discharged through a plurality of radially arranged openings 53 that are provided in the blower housing wall 24 and in a location to discharge freely into cavity 45 beneath housing flange 41. Such discharged air is subject to downward deflection against apron 40. The air so discharged will then follow the fillet 54 of base 3 to fan out radially over and along the surface 42 of flange 3 for dissipation into the ambient region about the vibrator device. The air so discharged is subject to dissipation in a large discharge area that is directed away from and which is well spaced from the air inlet or intake end at the crown 30 of the hood 28.

In the arrangement illustrated in FIG. 1, blower 22 is the moving instrumentality that actuates the air through the vibrator. The fan 21 acts as an agitating means to keep inlet air in motion while aiding in directing this air from cavity 43 into cavity 44. This fan 21 arrangement is disposed at the armature end of the motor which is normally the hottest portion of the motor unit and, therefore, the fan 21 insures against possible air stagnation or slow flow at a point where good cooling is essential.

The other fan or pocket type blower 22 is constructed for the dual purpose of moving the cooling air and for simultaneously inducing the vibratory motion in this motor driven assembly. As seen in FIG. 5, blower 22 has a plurality of radially arranged vanes 55 upstanding from the bottom blower base or disc 56 to form open pockets 57. One of the pockets is filled in with the blower material to provide a segmented weight 58 which forms the unbalanced instrumentality to generate the vibratory action of this device.

This particular construction provides a blower with an off center load to concentrate a dual operation into a single rotary member that performs two distinct and beneficial functions in a small space. A compact arrangement is thus evolved and confined to a small cavity in the vibrator base and the latter forms the support for the entire structural assembly. By this compactness, motor shaft 16 has its lower end 19 well supported on closely spaced bearings to either side of the blower to eliminate bending forces in the projecting motor shaft and to confine the unbalanced load forces solely to a shear action.

This is an important consideration in a vibratory device of this character particularly if the parts are made of the light weight metals such as aluminum or magnesium which are subjected to crystallization under transmitted forces acting to induce bending or to transfer bending stresses to adjacent parts.

With the described vibrator, air is chiefly controlled by the blower 22 with considerable initial agitation by the inlet area fan. Another construction is illustrated in FIG. 2 wherein a second blower 59 is provided in the inlet cavity 43 to be driven by shaft end 18 of motor 8 to develop pressurized air.

In the latter design, shroud or hood 28 has a crown 30 formed with an axial funnel 60 to establish an opening 61 protected by a screen 62. Blower 59 provides radial blades 63 with depending wings 64 formed to either side of a division disc 65 that aids in inlet air distribution from the opening 61. An upper annular ring 66 surrounds the blades 63 and provides a central sleeve 67 to encircle the funnel 60 for efficient air conduction and for the pressure dissipation thereof.

Figure 2:
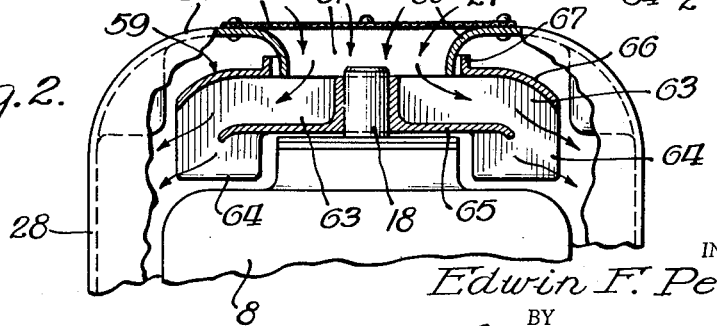
FIG. 2 is a fragmentary side elevation of the upper portion of a modified arrangement of motor driven vibrator, certain parts thereof being broken away to expose other parts in section.

In this design the blower 22 is augmented with a pressure inlet air delivery at the hot zone of the vibrator through the described arrangement of FIG. 2. Blades 63 and wings 64 create a pressurized airflow down over motor 8 and through cavity 44. Wings 64 keep the armature end of the motor well bathed with cool air circulation inducing constant fast heat dispersion or transfer away from the motor metal into the air stream directed toward the unbalanced second blower located at the opposite end of the motor driven vibrator 1. Air motion is continued at blower 22 for discharge.

In the construction illustrated in FIG. 8, the motor vibrator includes certain modifications particularly evident in the hood or shroud 70 and its assembly with the base 2 housing the blower or fan 22.

Shroud 70 comprises a crown 71 having inlet apertures 72 and 73 to supply ambient air to the fan 21. A plurality of inwardly beaded rings 74 surround the cylindrical part of the shroud to stiffen the unit to counteract resonant vibration of this extended portion of the shroud or hood.

The shroud is provided with an offset flange 75 to seat upon surface 11 of base 2 and an annular apron 76 depends from the offset flanged shoulder 75 to surround or encircle the outer perimeter of flange 41 of base 2. Apron 76 is formed with an out-turned rim 77 including a rounded intermediate portion 78 to cooperate with fillet 54 for smooth air discharge across the flange 3 of base 2. In this construction, screws 79 are used for securing base 3 to a device 7 and the rounded heads 80 of screws 79 are nested in recessed notches 81 to place them out of the normal airflow path of the discharging cooling air.

As an additional feature, apron 76 includes an inwardly directed offset ridge 82 that is proportioned and located to spring over flange 41 and to tightly snap in place under the lower face of the flange 41 to contribute to the attachment of the shroud 70 to the base 2. This construction eliminates the use of long screws such as 32 and crown notches 29 of the FIG. 1 design and employs radially positioned shorter screws 83 that enter threaded flange openings 84 provided in flange 41 of base 2.

The FIG. 8 construction also employs a deflector or baffle 85 that has a coplanar flange or rim 86 adapted for insertion between the motor base flange 10 and the top of the surface 11 on base 2. Screws 87 are provided to secure motor flange 10 over flange 41 of base 2 and the flange or rim 86 may include suitable notches or holes (not shown) to clear the locations of screws 87.

It should also be understood that the locations of screws 87 and screws 79 are staggered circumferentially for better clearance conditions and to avoid interference between fastening instrumentalities.

In the construction described, the shroud crown 71 is smooth and free of internal obstructions at the air inlet end. The beaded surface deformations act to break up any centrifugal wall clinging airflow downwardly of the cover shroud by causing air deflection toward the motor at bead intervals. The air then spills through bores 46 through the motor housing body 17 and enters the deflector 85 to pass through the central opening 88 therein for blower feed and subsequent transposition radially outwardly of the openings 53 in base 2 into the space 89. The air is then deflected about the rim end of the shroud for radially fanning expulsion out of space 90 over flange 3 and into the atmosphere.

The beaded configurations 74 of the shroud 70 together with the deformations comprising shoulder 75, offset ridge 82 and rim 77 all contribute to counteract resonant vibrations in the shroud material that would develop objectionable noises and crystallization of the hood material and its connected parts.

The FIG. 8 modification further includes an unbalanced fan or blower 21a on shaft 18 of motor 8 to thus provide a vibratory means at the outer end of the supported vibrator. A cast or otherwise installed weight 21b is shown as added between the vane structure of fan 21a to provide the off balanced instrumentality.

An advantageous feature in the FIG. 8 construction resides in the provision of an annular clearance area or recess 91 formed about the interior surface of wall 92 of base 2. This area or recess 91 establishes an efficient air guide discharge cavity or reservoir leading to ports 53. At the same time the recess 91 creates a predetermined space between the radially outer terminal ends of vanes 55 of the fan 22 and the inlet throats of the openings or ports 53 in the base 2. With such an arrangement, siren-like noises are reduced to a negligible minimum or they are counteracted entirely to enhance the smooth operation of the vibrator mechanisms.

The foregoing description relates to certain preferred constructions developed to carry out the inventive concept of the present invention. It is to be understood that certain changes are also contemplated in the exact combination presented or in the individual elements thereof without departing from the general concept of the invention. Such modifications shall, however, be governed by the breadth and scope of the language hereinafter appearing in the claimed subject matter directed to the air cooled motor vibrator of this invention.

What I claim is:

1. A vibration inducing device comprising a securing base, a self-contained motor mounted upon said base, a shroud connected with said base to completely enclose said motor between said base and shroud, air circulating means, said motor driving said air circulating means connected therewith to move the air through said auxiliary shroud and over said motor to cool the motor, said coacting shroud and base motor enclosure including air inlet and air outlet openings for air circulation through said shroud and base enclosure, and one of said air circulating means having a rotating air moving element including an unbalanced section thereon to create off center loads to vibrate the entire device.

2. A vibration inducing device comprising a partially hollow attachment base to secure the device to an object to be vibrated, a motor mounted upon said base, a shroud disposed to completely enclose said motor and having connection with said base about the hollow portion thereof, and air circulating means connected with said motor and driven thereby, said shroud and base having openings arranged for air conduction over and around said motor, one of said air circulating means being disposed in an area between said shroud and the motor, another of said air circulating means being disposed between said motor and base to operate in the hollow of the latter, and at least one of said air circulating means including an unbalanced part to induce off center loads to generate vibratory forces in the aforesaid assembly for transmittal to said object.

3. A vibration inducing device comprising a hollow attachment base, a motor and carried by said base surrounding the hollow therein, a shroud enclosing said motor connected with said base, said shroud having air passage openings therein to permit ambient air access to said motor and thereabout, a blower unit operatively connected with said motor and oriented thereby for rotation within said hollow attachment base, said base providing egress openings for air discharge into the atmosphere, and said blower unit structure including an unbalanced section to induce off center loads to generate vibratory forces in the aforesaid assembly.

4. In the vibration inducing device in claim 3, wherein said shroud and base form an annular air seal adjacent the juncture of the motor and base, and said motor includes a plurality of apertures in the body thereof adapted for air communication between the hollow of the base and the enclosure defined above the seal and formed between said shroud and motor.

5. In the vibration inducing device in claim 3, wherein said base is provided with a radial flange surrounding the blower unit cavity to form extended securing means, and said shroud includes a freely depending apron disposed in spaced relation about said hollow base and the egress openings therein while terminating in spaced relation with respect to said radial flange to provide means to divert discharged air toward and over the surface area of said securing flange.

6. In the device of claim 5 with the inclusion of a downwardly and outwardly curved end on said apron to provide a radial flange on the apron and spaced above said base flange, and said base including a filleted portion between the flange and the exterior of the hollow base to cooperate with said rim for smooth and efficient airflow discharge from the base egress openings into the radial exit space over the radial securing flange.

7. An air cooled motor driven vibrator assembly comprising a base having a circular wall outlining a blower compartment, said circular wall being provided with air passageways and having upper and lower outer flanges ringing said circular wall, said lower flange providing attachment means, a motor having a housing connected with the circular wall and enclosing the blower compartment, a blower connected with one end of said motor for rotation within said blower compartment, and a shroud to surround said motor including air passage openings adjacent the other end of motor, said shroud having connection with the upper flange of said base wall to establish an air cooling compartment about said motor above said upper base flange, said motor being provided with a plurality of air conducting apertures for communication between said shroud defined cooling compartment and said blower air compartment.

8. The combination in claim 7 including a second blower connected for rotation with the other end of said motor, both of said blowers functioning to force air through the described compartments and air passageways in a continuous unidirectional flow to cool said assembly.

9. The combination in claim 8 wherein one of said blowers is constructed with an unbalanced weighted section to induce off center load forces to generate vibratory motion in said assembly.

10. The combination in claim 7 wherein the shroud includes a shouldered portion intermediate the height thereof to seat upon said upper base flange to orient said shroud vertically of the motor, said shroud providing an apron extending from said shouldered portion to encircle the upper base flange to orient the shroud radially of said motor, said apron providing deflecting means to surround the circular base wall in spaced relation to the air passageways to cause circuitous airflow over the outer surface of the circular wall and over the surface of the lower base flange to cool said base member.

11. The combination of claim 10 wherein said apron is provided with an inwardly directed circumferential ridge to snap underneath the upper flange of the base to cooperate with the shouldered portion of the shroud to provide an air seal about the motor at said upper base flange and to aid in the orientation of the shroud in relation to the base.

12. In an air cooled motor vibrator assembly, the combination of a base having a flange for securement to a unit to be vibrated, a circular wall on said flange defining a compartment thereabove, a motor mounted on said base including an outwardly directed shaft extending through said compartment, a blower secured to said shaft and disposed for rotation within said compartment, an air channelling cover connected with said base and operatively cooperating with the motor structure to establish an air passageway with the blower compartment, said compartment including air passageways for communication with the exterior of the assembly, said blower comprising a relatively narrow air impelling element sandwiched between the adjacent motor and the adjacent base bottom of the compartment to concentrate the radial blower stresses over a small length of said extended motor shaft, said blower being constructed with an unbalanced weight section to generate off center load forces to vibrate the assembly, said motor and said base including bearings for said extended motor shaft closely positioned to either side of the unbalanced blower to confine the stresses to shearing action only upon the extended motor shaft while said vibrator is in operation.

13. In a vibration inducing device, in combination, a supporting base providing a compartment, a motor secured to said base and enclosing the compartment therein, said motor having a shaft disposed in said compartment, a blower secured to said shaft and having an unbalanced section to generate off center loads, an air channelling hood to surround said motor and said supporting base, and fastening means to assemble said base, motor and hood comprising a first screw means to secure said motor to said base to hold said units in fixed relation with respect to each other, and a second screw means to attach said hood to said support, said first and second screw means being aligned and including separable coacting portions to secure the hood in place upon said base and to permit removal of said hood without separation of the motor and base units.

14. An air cooled motor driven vibrator comprising a hollow attachment base, a motor mounted upon said base, a hood to enclose said motor connected with said base, said hood having air openings therein, said motor having air openings to permit air passage between said hood interior and the interior of said hollow base, an unbalanced blower having driving connection with said motor and operating in said hollow base, said base including air passageways leading from the hollow to the exterior, and an air deflector interposed between the juncture of said motor and base to guide supply air to the blower, said deflector comprising a dished baffle having a central air passage opening for said blower and an external annular rim, said rim being tightly held between adjacent portions of said motor and base to orient the deflector and to prevent displacement thereof under operative vibratory conditions.

15. The combination of claim 14 wherein said base is provided with an annular recess of predetermined depth to receive said deflector rim, and said deflector rim is provided with undulations subject to limited depression under the assembly of said motor with said base to frictionally sandwich the deflector rim between the motor and recess bottom.

16. In a motor driven vibrator comprising, in combination, a hollow base, a motor mounted upon said base, an unbalanced blower connected with said motor and operating in said hollow base, said base and motor having air passageways communicating with said blower, and a hood over said motor providing an inlet air chamber about said motor and defining an outlet air chamber around said base, said hood having air entry openings adjacent the armature end of the motor to direct cool air to said motor end, said hood having circumferential inwardly directed beads spaced along the length thereof to stiffen the unit and to cause air deflection toward the motor at the bead locations to counteract centrifugal air bypass along the length of the motor under operative conditions.

17. In a vibrator as in claim 16, wherein said hood includes a shoulder in the length thereof to seat upon a portion of the base, and the terminal base end of the hood is formed into an outwardly directed rim to stiffen the bottom bell like open portion of the hood, said beads, the shoulder, and the rim together providing means to counteract resonance in the hood material during the vibratory operation of the device and to counteract crystallization of the various connected vibrator parts under vibration.

18. A vibration inducing device comprising a mounting base, a self-contained motor having one end thereof mounted upon said base, a shroud connected with said base and disposed to surround said motor whereby said base and shroud completely confine said motor therein, air circulating units operatively connected with and driven by said motor in predetermined outwardly spaced locations with respect to the mounting base, said shroud and base including ambient air inlet and air outlet openings to the surrounding ambient air for said air circulating units, and said air circulating units each having unbalanced sections thereon to provide vibratory action at dual locations spaced successively outwardly with respect to said mounting base.

19. A vibration inducing device comprising a hollow attachment base, a motor carried by said base enclosing the hollow therein, a shroud surrounding said motor and connected with said base, said shroud having air passage openings therein to permit ambient air access to said motor and thereabout, said motor including openings in the body thereof to permit airflow from the shroud toward the hollow of the base, a blower unit operatively connected with said motor and oriented thereby for rotation within said hollow of said attachment base, said base providing egress openings for air discharge into the atmosphere, and said blower unit structure including an unbalanced section to induce off center loads to generate vibratory forces in the aforesaid assembly, and an air deflector interposed between said motor and said hollow of the base to direct the air from the motor body apertures toward the central region of the blower unit, said air deflector having an opening for discharge of said directed air into the blower unit at said central region.

20. A vibration inducing device comprising a hollow attachment base, a motor carried by said base enclosing the hollow therein, a shroud surrounding said motor and connected with said base, said shroud having air passage openings therein to permit ambient air access to said motor and thereabout, said motor including openings in the body thereof to permit airflow from the shroud toward the hollow of the base, a blower unit operatively connected with said motor and oriented thereby for rotation within said hollow of said attachment base, said base providing egress openings for air discharge into the atmosphere, and said blower unit structure including an unbalanced section to induce off center loads to generate vibratory forces in the aforesaid assembly, said air egress openings in said base being provided in the walls of the hollow base to peripherally surround the radially outer region of the blower unit.

References Cited in the file of this patent
UNITED STATES PATENTS

| | | |
|---|---|---|
| 2,235,158 | Krenzke | Mar. 18, 1941 |
| 2,425,655 | Tomkins | Aug. 12, 1947 |
| 2,674,994 | Murphy | Apr. 13, 1954 |
| 2,707,949 | Sadlon | May 10, 1955 |
| 2,721,427 | Dremel | Oct. 25, 1955 |
| 2,785,325 | Keyner | Mar. 12, 1957 |
| 2,854,594 | Philippovic | Sept. 30, 1958 |